Aug. 16, 1966  W. P. LEAR  3,266,942
DRY CELL BATTERY
Filed April 11, 1963  2 Sheets-Sheet 1
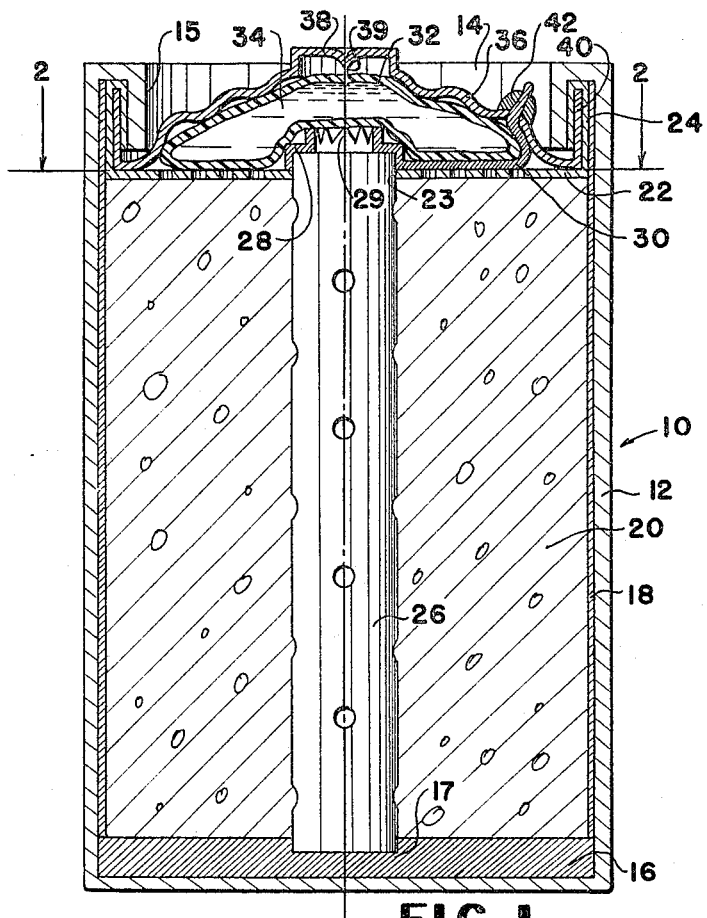
FIG. 1
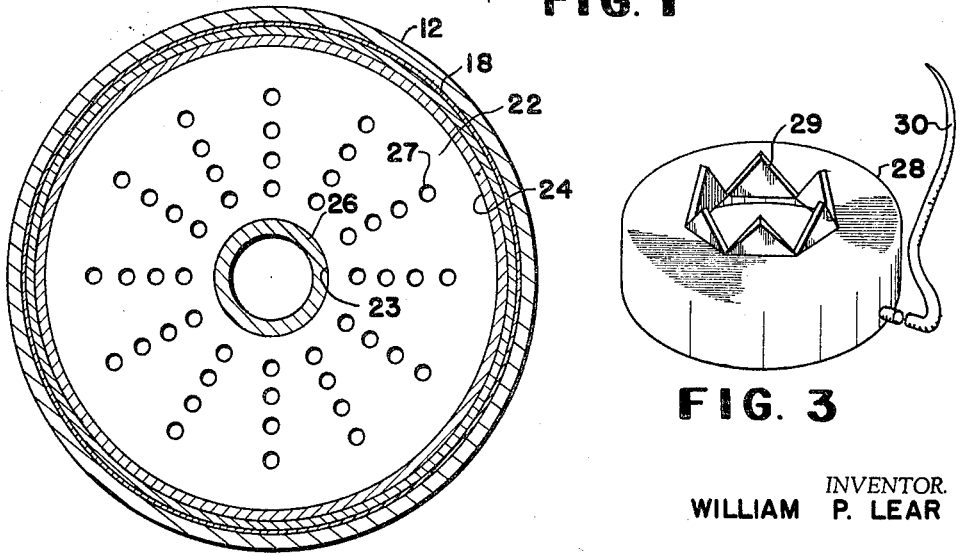
FIG. 2
FIG. 3
INVENTOR.
WILLIAM P. LEAR Aug. 16, 1966   W. P. LEAR   3,266,942
DRY CELL BATTERY
Filed April 11, 1963   2 Sheets-Sheet 2

INVENTOR:
WILLIAM P. LEAR 3,266,942
DRY CELL BATTERY
William P. Lear, Wichita, Kans., assignor to Lear Jet Corporation, Wichita, Kans., a corporation of Delaware
Filed Apr. 11, 1963, Ser. No. 272,458
10 Claims. (Cl. 136—90)

The invention relates to dry cell batteries. In a more specific aspect, this invention relates to dry cell batteries which can be activated from an inactivated state prior to being put into service. Still more specifically, this invention relates to dry cell batteries which when in an inactivated state have a very long shelf life and will not deteriorate or self-discharge, and can be activated prior to being put into service. Still more specifically, this invention relates to a dry cell battery which can be activated by rupturing a compartment within the battery containing a liquid which floods the cell to thereby bridge the electrodes of the battery.

Dry cell batteries are known in the art and are in general use today. The known dry cell battery utilizes carbon as the positive electrode, zinc as the negative electrode, and a solution of ammonium chloride and a depolarizer agent. The dry cell batteries known to the prior art have a number of rather serious shortcomings. In general, these dry cells deteriorate on standing. This deterioration is due in part to local action, caused by impurities more electropositive than zinc which plate out on the surface of the zinc electrode wherever they are near the zinc metal. In such cases, exposed zinc near such a plated metal acts as an anode and the more electropositive metal as cathode, the metal of the can supplies the short circuit and the electrolyte of the cells serves as the electrolyte of the local couple. In the continuous discharge of such local couples, the zinc goes into solution and hydrogen is plated out on the other metal. This action causes a slow discharge of the cell, and is a serious consideration when the dry cells are stored or not used for prolonged periods of time. In other cases, polarization reduces the local action, or the action may form insoluble products which incrust the surface reducing the efficiency and power of the dry cell. Even in the absence of impurities, inequalities in the structure of the zinc, such as a portion of the zinc electrode under more stress, may cause local action. This condition causes a slow discharge of the dry cell and in severe cases may cause a hole in the zinc can electrode to be formed allowing leakage of the electrolyte. Leakage of the electrolyte can seriously damage other dry cells and materials stored along with the defective dry cell, or can seriously damage or destroy equipment containing such deteriorated defective dry cells.

There is a present pressing need for a dry cell battery which will retain its full charge and strength for prolonged periods of time. For example, radiological civil defense equipment is being stored in various locations awaiting a potential emergency. The planned for emergency may come at some later unascertained time. With present dry cells a periodic checking and replacement of the dry cells used for emergency power is necessary in order to insure that they will be in working order if ever needed. This constant renewal of batteries is both expensive, time consuming and tedious and there is always the possibility that it will not be done. When and if an emergency does occur, it is very important that all of the civil defense equipment be in proper working order. A fully charged active dry cell battery in most instances provides the power source for this equipment. Without good batteries, this equipment is useless.

Further, it is very important that the equipment used in civil defense, and other applications, not be damaged by a dry cell that develops a leak. The electrolyte in a dry cell battery is in general very corrosive and could render vital complicated and expensive apparatus out of order, or completely destroy it.

I have invented a dry cell battery which overcomes all of the problems associated with the dry cell batteries known to the prior art. My invention is a deferred action type dry cell battery having electrodes, one of which is preferably a container-shaped electrode, and preferably with a second electrode within the container-shaped electrode. The battery of my invention has an electrically conductive material and preferably a depolarizing agent mixed therewith, which in my preferred embodiment is disposed in the container-shaped electrode. An arrangement is provided with my dry cell battery that is constructed and adapted in operation to enable liquid to be distributed to the electrically conductive material. This arrangement in a preferred specific embodiment of my dry cell battery is an openable container having a liquid disposed within the dry cell battery associated with a means to open the container to thereby contact the liquid and the conductive material. Another preferred embodiment of my invention for distributing liquid to the electrically conductive material is an aperture or opening having disposed therein a plug or the like of resilient material enabling the needle of a hypodermic syringe to be inserted therethrough. In this embodiment, the liquid is introduced and distributed to the electrically conductive material by use of the syringe inserted through the resilient material.

The dry cell battery of my invention is in an inert, inactivated state prior to opening the container, and while in this state, can be stored for an indefinite prolonged period of time without deterioration. When the openable container containing the liquid is opened, the cell is activated. Upon being activated, the dry cell battery can develop voltage and is essentially a new fresh dry cell battery.

The new sealed deferred-action type dry cell battery of my invention solves all of the aforementioned problems associated with dry cell batteries known to the prior art. My dry cell battery can be stored or left unused in an inactivated condition for prolonged periods of time, and when activated will develop its full rated power and voltage. My dry cell battery will not self-discharge since the mixture of graphite, or other conductive material, and depolarizing agent is in a dry state and will not furnish a bridge for local actions. Further, since the battery has no electrolyte in liquid form in the conductive dry mixture in the cell, no local couples on the zinc can develop to encrust the surface since there is no complete circuit. For the same reason, a leak will not develop in the zinc can due to local action, which could render the cell useless and possibly damage equipment, etc. in close proximity to a leaky cell. Further, if the zinc can electrode is inadvertently punctured, the fluid or liquid in the cell cannot leak out since it is sealed in a container prior to the cell being activated. No insoluble products will be formed to encrust the surface of either the zinc can electrode or the carbon electrode to thus limit or decrease the voltage or power of the cell. My new dry cell battery can be utilized in equipment that is used intermittently and stored for long periods of time such as civil defense equipment and the like.

The dry cell battery of my invention is preferably a sealed unit. Both before and after the dry cell battery of my invention is activated, the liquid or electrolyte will not leak out of the cell to cause trouble and/or damage to adjacent cells or equipment. Activating the dry cell battery of my invention is a simple matter involving only the application of pressure at a critical exterior point of the battery. Activation of my dry cell is a simple, safe, fast uncomplicated operation. The dry cell batteries are rendered active almost immediately after being activated to enable same to develop their full-rated voltage and power even though stored for very long periods of time. The dry cell battery of my invention can be handled and stored in the conventional manner of handling dry cells. It can be tipped, rolled, inverted, and subjected to a reasonable amount of shock without becoming activated. Thus, in short, the dry cell battery of my invention is safe, easy to handle and activate, relatively inexpensive to manufacture, capable of being stored for prolonged periods of time without deteriorating, and capable of developing its full-rated voltage and power regardless of how long it may have remained stored and dormant.

It is an object of this invention to provide a new dry cell battery.

Another object of this invention is to provide a dry cell battery having an extended shelf life and which will not deteriorate or self-discharge over prolonged periods of storage or non-use.

Still another object of this invention is to provide a dry cell battery which can be stored in an inactivated dormant state, and subsequently activated prior to being put into service, and which will thereupon develop the full-rated voltage and power.

Another object of this invention is to provide a sealed dry cell battery having the liquid electrolyte physically separated from the electrodes and out of contact therewith, and adapted to be flooded by electrolyte by breaking the enclosure containing the electrolyte.

Still another object of this invention is to provide a dry cell battery which will not self-discharge, deteriorate, or develop leaks in the container thereof while not in use.

Another object of this invention is to provide a deferred action type dry cell battery having a compartment for storing a liquid in the battery separate from the electrodes, and which can be handled in the conventional manner of handling dry cells including inverting, subjecting to a reasonable amount of shock, etc. without activating same.

Yet another object of this invention is to provide a dry cell battery which can be easily and simply activated without cell battery tools, procedures, etc.

Another object of this invention is to provide a dry cell battery which after being activated will immediately develop its full-rated voltage and power.

Another object of this invention is to provide a deferred action type dry cell battery which can be produced easily and economically.

Other objects and advantages of the invention will be apparent to those skilled in the art from the disclosure set forth herein. Drawings of the preferred specific embodiment of the invention accompany and are a part hereof, and such are to be understood to not unduly limit the scope of the invention. In the drawings:

FIG. 1 is a front elevational view in cross section of a preferred specific embodiment of my new deferred action type dry cell battery.

FIG. 2 is a top elevational view in cross section taken on line 2—2 of FIG. 1.

FIG. 3 is a perspective view of the electrode cap element used in my new dry cell battery.

Figure 4:
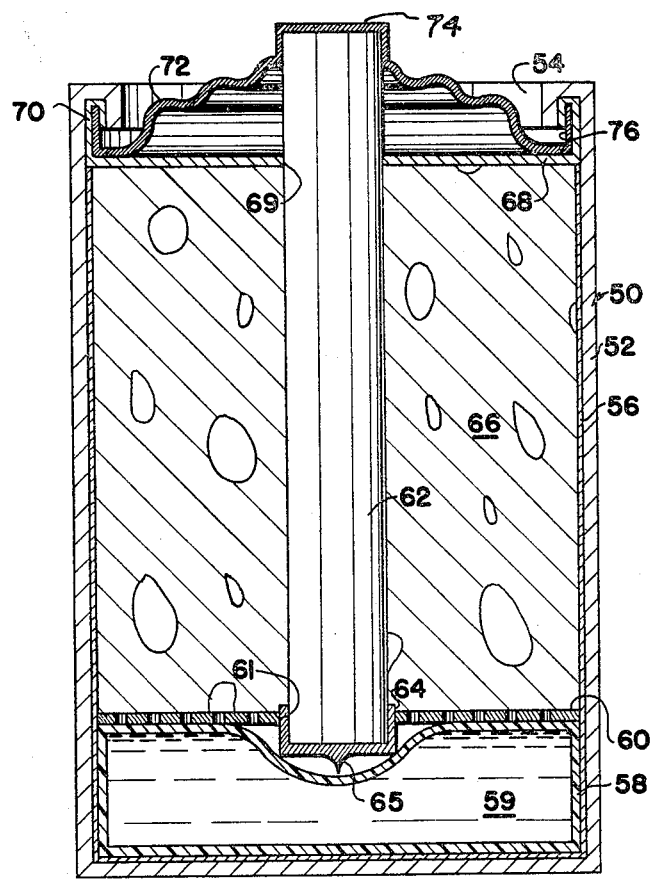
FIG. 4 is a front elevational view in cross section of another specific embodiment of my new deferred action type dry cell battery.

The following is a discussion and description of the new embodiments of the dry cell battery of my invention made with reference to the drawings wherein the same reference numerals are used to indicate the same or similar parts and/or structure. The discussion and description are of the preferred specific embodiments of the new dry cell battery of my invention and it is to be understood that such is not to unduly limit the scope of my invention.

Referring now to the drawings, FIGS. 1–3, dry cell battery 10 is a preferred specific embodiment of the sealed deferred action type dry cell battery of my invention which will remain dormant and inert until activated. The dry cell battery has a unitary cylindrically shaped zinc can 12 having a closed bottom end and an open top end 14, the can 12 constituting the anode of the battery. The can 12 can be made of any suitable metallic material having an electrolytic potential above hydrogen on the electromotive series and be of any suitable thickness, preferably in the range of .1 to .005 inch. The thickness, is largely dependent on the cell size. The can electrode is preferably made of high purity zinc and has a thickness of .010 inch. The can electrode can be formed by any suitable process. A technique which can be used is to feed zinc slugs, in this case about one inch in diameter and about $\frac{1}{16}$ inch thick, from an overhead hopper to a modified punch press. The slugs are nested individually in a cavity in a special die only a little deeper than the thickness of the slugs. It can then be struck with a coaxial punch, and the material forced up around the punch to form an extruded can. On the upstroke of the ram, the punch hinges and the finished can can be blown off by air pressure against a soft cloth to prevent distortion of it as it drops into another hopper. It is also contemplated that the concept and structure of my invention can be applied to dry cells wherein the can is the cathode.

A circular polyethylene plastic disc 16 is snugly disposed in the bottom of can 12. Disc 16 has a central circular shaped depression 17. The plastic disc 16 can be made of any suitable type material such as plastics, ceramics, wood, etc. Preferred materials for making disc 16 are high temperature polyethylene, nylon, acetal resin, bakelite, and the like. Nylon is a polymeric resin formed by the condensation of a dibasic organic acid with diamine into a linear chain contaning amide groups. Acetal resin is a stabilized form of polymerized formaldehyde, an example of which is sold under the trademark Delrin and produced by E. I. du Pont de Nemours. A finely divided granular mixture of manganese dioxide and graphite 20 is disposed within the can 12 in an amount sufficient to substantially fill same. Any other suitable depolarizing agent can be used instead of manganese dioxide. Further, any suitable conductive material can be used instead of graphite. For example, acetylene black can be used as a conductive material. A liner means 18 is used to separate the mixture of manganese dioxide and graphite 20 and can 12 thus preventing direct contact therebetween. The liner means 18 is preferably a pulpboard liner, a cotton bag, or a paste. An insulator means is disposed within and adjacent the top end 14 of the can 12. This insulator means is a thin circular perforated molded plastic disc 22 having a central aperture 23 and an axially upwardly extending flange 24. The insulator means disc 22 is positioned in the can 12 with aperture 23 aligned with aperture 17 in disc 16. The insulator means disc 22 can be made of any suitable material. It can be formed from any of the aforementioned listed materials for disc 16. The preferred material for forming insulator means disc is polyethylene. A hollow tubular perforated carbon cathode 26 is disposed axially within can 12 and seated in circular shaped depression 17 of disc 16 and extends through aperture 23 in insulator means disc 22. The hollow carbon cathode is made hollow and perforated in order to more quickly distribute the electrolyte fluid or liquid through the battery. However, a solid carbon cathode or rod can be used if desired in place of the hollow cathode 26 depicted in the drawings. As shown in FIG. 2, insulator disc 22 has a plurality of apertures 27 disposed therein which are adapted to allow the flow of electrolyte to the top of graphite and manganese dioxide mixture 20. A cap means 28, provided with sharp longitudinally extending barb means 29 and a lead wire means 30, is disposed over carbon cathode 26 above disc 22. The cap means can be made of any suitable electrically conductive material. A preferred material for making cap 28 is brass. A thin flexible plastic sealed sack or bag 32 is disposed in the open end 14 of can 12 in overlying relationship to the cap means 28, insulator disc 22, and barb means 29. The sealed sack can be formed of any suitable material. Preferably the bag is made of a flexible plastic material such as polyethylene, polypropylene, polyvinyls, etc. The most preferred material for use in the plastic sealed bag is polyethylene. The polyethylene material preferably has a thickness of .001 inch. An electrolyte solution 34 of ammonium chloride and water is disposed within the sealed sack 32. The volume of the electrolyte solution can be of any suitable amount. I have found that it is desirable that the volume of the electrolyte solution be that of approximate ⅓ of the volume of the dry cell battery. Any other suitable electrolyte solution can be used. If desired, distilled water alone can be disposed in the plastic sealed sack with the salt of the electrolyte mixed in the graphite and manganese dioxide mixture 20. A thin flexible end cap 36 is secured to the open end of can 12. End cap 36 has a generally convex shape with a central upwardly facing electrical contact button 38 having a downwardly facing barb means 39 and axially extending flange means 40 disposed in close parallel relationship to the flange 24 on insulator means 22. Preferably, end cap 36 has a series of concentric corrugations to make it more flexible. As shown in FIG. 1, the top edge 15 of can 12 together with a portion of flange 24 of insulator disc 22 are rolled over flange 40 of end cap 38, securing same to can 12 and forming a tight effective seal. This arrangement also effectively insulates cap 38 from can 12. The end cap 36 is joined to the lead wire 30 of cap means 28 to form an electrical contact therebetween by soldering lead wire 30 to the end cap 36 with a dab of solder 42. The top cap 36 can be made of any suitable flexible electrically conductive material or metal. Any suitable metal that will resist corrosion is suitable. The most preferred metal for making the cap is brass, preferably of thickness of .005 inch. The end cap 38 is designed so that a relatively small force applied longitudinally on electrical contact button 38 will force the barb 39 into the electrolyte sack. Flexible end cap 36 in cooperation with the lance means 29 on the electrode cap 28 is adapted to rupture sack 32. The end cap 36 can be designed to require any suitable force to bend same. However, I have found that a force of one pound applied on the end cap to rupture the bag or sack works quite well.

From the foregoing description of this embodiment of my invention, it can be seen that the dry cell can be actuated by rupturing the sack containing the electrolyte solution. When the bag is ruptured, the electrolyte solution will flow downwardly through the apertures 27 in insulator 22, and also downwardly through the hollow electrode 26 and out of the apertures therein to quickly and completely flood the graphite and manganese dioxide mixture in the cell. Until the cell is flooded with the electrolyte or liquid, the cell is in a deactivated and dormant state and will not deteriorate, self-discharge, etc. When the electrolyte is introduced into the graphite and manganese dioxide mixture or other depolarizing agent, the dry cell 10 is a fresh dry cell battery and is capable of immediately putting forth its full-rated voltage and power regardless of how long the dry cell had been stored prior to its being activated.

Another embodiment of my sealed deferred action type dry cell battery is illustrated in FIG. 4. Dry cell battery 50 has a unitary cylindrically shaped zinc can 52 having a closed bottom end and an open top end 54. Zinc can 52 constitutes the anode of the battery 50. Any other suitable type of metal or material can be used to make can 52, as stated hereinbefore in regard to the embodiment shown in FIG. 1. A porous paper liner 56 is disposed within can 52. Disposed in the bottom of can 52 is a thin flexible polyethylene plastic sealed sack 58. The sack 58 can be formed of any suitable type of material of a suitable thickness enabling it to be ruptured. An electrolyte solution 59 of ammonium chloride and water are disposed within the sealed sack 58. If desired only liquid can be disposed in the sack 58, with the salt of the electrolyte in the battery. Disposed in overlying relationship to the plastic sealed sack 58 is a circular perforated polyethylene plastic disc 60 having a central aperture 61. Disc 60 can be formed of any suitable material that is inert to the chemicals, etc., contained within the dry cell battery. Such material can be plastic, ceramic, paper, etc. Preferably, disc 60 is firmly wedged within the dry cell battery so that it maintains its spaced relationship from the bottom of can 52. A tubular carbon cathode 62 is disposed axially within can 52 with the lower end disposed in aperture 61 of perforated disc 60 and with the opposite upper end protruding from the open end 54 of can 52. It can be seen that disc 60 provides a convenient aligning means for carbon cathode 62. A brass cathode cap 64 provided with a sharp longitudinally extending barb means 65 is disposed over the lower end of carbon cathode 62. Barb 65 is positioned relative to sack 58 so that movement of same will serve to rupture sack 58 allowing escape of electrolyte 59. A finely divided dry granular mixture 66 of manganese dioxide and graphite is disposed within can 52 in an amount to substantially fill same. An insulator means 68, comprised of a thin circular molded polyethylene plastic disc having a central aperture 69 and an upwardly extending flange 70 is positioned in can 52 adjacent the top thereof with the carbon cathode 62 projecting through the central aperture 69 and with flange 70 disposed in close parallel relationship to the top wall portion of the can. A thin flexible brass end cap means 72 is secured to the open end 54 of can 52. Cap means 72 has a generally convex shape with a central upwardly facing electrical contact button 74 intimately contacting the top end portion of the carbon cathode 62 and an axially extending flange means 76 disposed in close parallel relationship to flange 70 of insulator means 68. As shown in FIG. 4, the battery is sealed by rolling the top edge portion of can 52 and flange 70 over the flange 76 of the end cap means in overlying relationship thus forming a sealed battery with the can 52 and the end cap 72 electrically insulated from each other by the interposition of the flange portion 70 of the insulator means. Battery 50 constructed in the aforementioned manner is adapted to remain inert over extended periods of time without deteriorating or self-discharging and can be activated prior to being put into service by forcing the flexible end cap 72 axially inwardly thereby moving carbon cathode 62 and cap means 64 longitudinally toward the bottom of the battery. This movement forces barb 65 into the flexible sack 58 breaking it allowing the electrolyte 59 to flood the interior of the battery.

Figure 5:
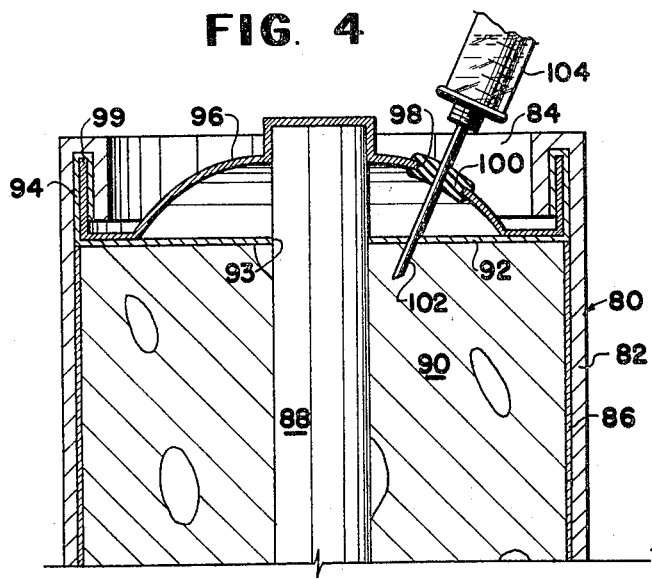
FIG. 5 is a front elevational view in cross section of still another preferred specific embodiment of my new deferred action type dry cell battery.

Still another embodiment of my deferred action type dry cell battery is illustrated in FIG. 5. Dry cell battery 80 has a unitary cylindrically shaped zinc can 82 having a closed bottom end and an open top end 84 which constitutes the anode of the battery. A porous paper liner means 86 is provided for lining the interior of can 82. In general, the lower end of battery 80, not shown in FIG. 5, is substantially the same as the lower end of the embodiment shown in FIG. 1. Disposed in the bottom of battery 80 is a circular polyethylene plastic disc 16 having a central circular shaped depression 17. A tubular carbon cathode 88 is disposed axially within can 82 and seated in the circular shaped depression of disc 16. The carbon cathode 88 can be hollow and perforated similar in construction to cathode 26 shown in FIG. 1 if desired. A finely divided dry granular mixture 90 of manganese dioxide and graphite is disposed within can 82 in an amount sufficient to substantially fill same. An insulator means 92 is disposed within and adjacent the top open end 84 of can 82. Insulator means 92 is a thin circular preferably porous plastic disc having a central aperture 93 and an upwardly extending flange 94. Insulator means 92 is positioned in can 82 with the carbon cathode 88 projecting through the central aperture 93 and with flange 94 in close parallel relationship to the top wall portion of can 82. An end cap means 96 is secured to and closes the open end 84 of can 82. Cap means 96 intimately contacts the top portion of carbon cathode 88 forming an electrical contact therebetween and is provided with an aperture 98 and axially extending flange means 99 which is disposed in close parallel relationship to the flange 94 of insulator means 92. As illustrated in FIG. 5, the top edge portion of the can 52 and flange 94 are rolled over the flange 99 in overlying relationship forming a sealed battery unit. A plug means 100 of a resilient relatively soft rubber material is disposed in aperture 98 in sealed relationship thereto. Any suitable form of plug means can be used instead of a rubber plug 100 as illustrated. For example, the entire space between cap 96 and insulator means 92 could be filled with some form of resilient material. Further, the aperture 98 could if desired be positioned in another location in battery 80. The battery 80 is adapted to remain inert over extended periods of time without deteriorating or self-discharging and adapted to be activated prior to being put into service by inserting the needle 102 of a hypodermic syringe 104 containing liquid or electrolyte through the plastic plug means 100 and injecting liquid or electrolyte solution into the interior of the battery. If desired, plug means 100 could be substituted with a suitable valve or the like to allow electrolyte to be introduced and distributed within the interior of the battery. The various materials used to make the elements in both the embodiment 50 and 80 of my dry cell battery can be substituted for any suitable type of material. In general, the substitution and choice of materials set forth in the embodiment 10 shown in FIG. 1 of my invention are applicable to the respective corresponding elements in the embodiments 50 and 80 of my dry cell battery.

The dry cell battery of my invention can be produced in any suitable size ranging from small miniature sizes to very large sizes. It can also be applied to an arrangement of a number of dry cell batteries arranged in series or in parallel to make possible higher voltages or amperages.

While I have described and illustrated preferred embodiments of my invention, it is understood that the sealed deferred action type dry cell battery of my invention disclosed can be made in other forms than herein described and suggested without departing from the spirit of my invention.

I claim:

1. A sealed, deferred action type, dry cell battery which will remain inert until activated comprising, a unitary cylindrically shaped zinc can having a closed bottom end and an open top end, said can constituting the anode of said battery, a circular plastic disc snugly disposed in the bottom of said can, said disc having a central circular shaped depression, a hollow tubular perforated carbon cathode disposed axially within said can and seated in said circular shaped depression of said disc, a porous paper liner means for said can, a finely divided granular mixture of manganese dioxide and graphite disposed within said can in an amount sufficient to substantially fill same, an insulator means disposed within and adjacent the top end of said can, said insulator means comprised of a thin, circular perforated, molded plastic disc having a central aperture and an axially upwardly extending flange, said insulator means positioned in said can with said carbon cathode projecting through said central aperture and with said flange in close parallel relationship to the top wall portion of the can, a metallic cathode cap means provided with sharp longitudinally extending barb means and a lead wire means, said cap snugly disposed over the end of said carbon cathode with said barb means extending upwardly, a thin flexible plastic sealed sack disposed in the open end of said can in overlying relationship to said barb means on said cap means and said insulator means, an electrolyte solution of ammonium chloride and water disposed within said sealed sack, a thin flexible metallic end cap means secured to and closing the open end of said can, said last-mentioned cap means having a generally convex shape, a central upwardly faced electrical contact button provided with a downwardly facing barb means, and an axially extending flange means disposed in close parallel relationship to said flange on said insulator means, said end cap means joined to said lead wire means of said first-mentioned cathode cap means, the edges of the top edge portion of said can, and said flanges on the insulator means and end cap means being secured together in overlying relationship forming a sealed battery unit with said can and said end cap electrically insulated from each other by the interposition of the flange portion of said insulator means, said battery adapted to remain inert over extended periods of time without deteriorating or self-discharging and adapted to be activated prior to being put in service by forcing the flexible end cap axially inwardly thereby breaking said sealed sack and flooding the interior of the battery with electrolyte.

2. A sealed, deferred action type dry cell battery comprising, a zinc can constituting the anode of said battery, a hollow tubular perforated carbon cathode disposed axially within said can, a porous liner means for said can, a mixture of manganese dioxide and graphite disposed within said can, an insulator means disposed within and adjacent the top end of said can, said insulator means comprised of a thin circular perforated element having a central aperture and an extending flange, said insulator means positioned in said can with said carbon cathode projecting through said central aperture and with said flange arranged in parallel relationship to the top wall portion of the can, a first cap means disposed over the end of said carbon cathode, a thin flexible plastic sealed sack disposed in said can in overlying relationship to said insulator means and said first cap means, an electrolyte solution disposed within said sealed sack, a flexible second cap means secured to and closing the open end of said can, said second cap means having a flange means disposed in close parallel relationship to said flange on said insulator means, a connector means connecting said first cap means and said second cap means, the top portion of said can, said flange means of said insulator means, and said flange means on said second cap means being secured in sealed relationship with said can being electrically insulated from said second cap means, said battery adapted to remain inert over extended periods of time without deteriorating or self-discharging and adapted to be activated prior to being put into service by forcing said second cap means axially inwardly thereby breaking said sealed sack and flooding the interior of the battery with electrolyte.

3. A sealed, deferred action type dry cell battery comprising, a container shaped electrode, a porous liner means in said container shaped electrode, a second electrode disposed within said container shaped electrode, a mixture of an electrically conductive material and a depolarizing agent disposed in said container shaped electrode, an insulator means disposed within and adjacent the top end of said container shaped electrode, said insulator means having an extending flange arranged in close parallel relationship to the top portion of said container shaped electrode, a sealed rupturable container disposed in overlying relationship to said insulator means, a liquid sealed within said rupturable container, a flexible end cap means secured to and closing the open end of said container shaped electrode and insulated from same by said insulator means, a means electrically connecting said second electrode and said flexible cap means, said battery adapted to remain inert over extended periods of time without deteriorating or self-discharging and adapted to be activated prior to being put into service by forcing the flexible end cap inwardly thereby breaking said sealed container and flooding the interior of the battery with liquid.

4. A sealed, deferred action type dry cell battery comprising, a unitary cylindrically shaped zinc can having a closed bottom end and an open top end, said can constituting the anode of said battery, a circular insulator washer snugly disposed in the bottom of said can, an elongated tubular carbon cathode disposed axially within said can abutting said insulator washer, a porous liner means for said can, a finely divided mixture of manganese dioxide and graphite disposed within said can, annular washer means disposed in overlying relationship to said mixture, a barb means, a sealed rupturable container disposed above said washer and said barb means, an electrolyte in said rupturable container, a movable surface means overlying said rupturable container adapted to be moved by a force applied to the exterior of said dry cell battery to rupture said rupturable container, sealing means for sealing the end of said zinc can, said dry cell adapted to be activated by rupturing the rupturable container to flood said cell with electrolyte solution.

5. A sealed, deferred action-type, dry cell battery which will remain inert until activated, comprising, a unitary cylindrically shaped zinc can having a closed bottom end and an open top end, said can constituting the anode of said battery, a porous liner means for said can, a thin flexible plastic sealed sack disposed in the bottom of said can, an electrolyte solution of ammonium chloride and water disposed within said sealed sack, a circular perforated plastic disc having a central aperture disposed in overlying relationship to said plastic sealed sack, a tubular carbon cathode disposed axially within said can having a lower end disposed in said aperture of said perforated disc and an opposite end protruding from the open end of said can, a metallic cathode cap means provided with sharp longitudinally extending barb means disposed over the lower end of said carbon cathode, a finely divided dry granular mixture of manganese dioxide and graphite disposed within said can in an amount to substantially fill same, an insulator means disposed within and adjacent the top end of said can, said insulator means comprised of a thin circular molded plastic disc having a central aperture and an axially upwardly extending flange, said insulator means positioned in said can with said carbon cathode projecting through said central aperture and with said flanges in close parallel relationship to the top wall portion of the can, a thin flexible metallic end cap means secured to and closing the open end of said can, said last-mentioned cap means having a generally convex shape, a central upwardly facing electrical contact button intimately contacting the top end portion of said carbon cathode, and an axially extending flange means disposed in close parallel relationship to said flange on said insulator means, the edges of the top edge portion of said can and said flange on said insulator means being secured together with the flange of said end cap means in overlying relationship forming a sealed battery with said can and said end cap electrically insulated from each other by the interposition of the flange portion of said insulator means, said battery adapted to remain inert over extended periods of time without deteriorating or self-discharging and adapted to be activated prior to being put into service by forcing the flexible end cap axially inwardly thereby breaking said sealed sack and flooding the interior of the battery with electrolyte.

6. A sealed, deferred action type dry cell battery comprising, a zinc can constituting the anode of said battery, a porous liner means for said can, a sealed flexible sack disposed in the bottom of said can, a liquid disposed within said sealed sack, a carbon cathode disposed axially within said can having a lower end positioned in close proximity to said sealed sack, a barb means on the lower end of said carbon cathode, a mixture of a depolarizing agent and graphite disposed within said can, an insulator means disposed within and adjacent the top end of said can, said insulator means having a tubular portion positioned in close parallel relationship to the top wall portion of the can, a flexible cap means secured to and closing the open end of said can, a central upwardly facing electrical contact button on said end cap means intimately contacting the end portion of said carbon cathode, an axially extending flange means on said end cap means disposed in close parallel relationship to said tubular portion on said insulator means, the edges of the top portion of said can and said tubular portion on said insulator means being secured together in overlying relationship forming a sealed battery unit with said can and said end cap electrically insulated from each other by the interposition of the tubular portion of said insulator means, said battery adapted to remain inert over extended periods of time without deteriorating or self-discharging and adapted to be activated prior to being put into service by forcing the flexible end cap means axially inwardly thereby breaking said sealed sack and flooding the interior of the battery with liquid.

7. A sealed, deferred action-type dry cell battery comprising, a container shaped electrode, a porous liner means for said container shaped electrode, breakable envelope disposed in the bottom of said container shaped electrode, a liquid in said envelope, an elongated carbon electrode disposed axially within said container shaped electrode and over said envelope, barb means associated with the lower end of said carbon electrode, a mixture of an electrically conductive material and a depolarizing agent disposed within said container shaped electrode and surrounding said carbon electrode, a flexible end cap means secured to and closing the top of said container shaped electrode, said carbon electrode being supported in sliding relation within said mixture with its top end in physical contact with said flexible end cap means, said battery being adapted to remain inert over extended periods of time without deteriorating and adapted to be activated by the displacement of the flexible end cap inwardly thereby opening said openable container, flooding the interior of the battery with liquid.

8. A sealed, deferred action type dry cell battery which will remain inert until activated, comprising, a unitary cylindrically shaped zinc can having a closed bottom end and an open top end, said can constituting the anode of said battery, a circular plastic disc snugly disposed in the bottom of said can, said disc having a central circular shaped depression, a porous liner means for said can, a tubular carbon cathode disposed axially within said can and seated in said circular shaped depression of said disc, a finely divided dry granular mixture of manganese dioxide and graphite disposed within said can in an amount sufficient to substantially fill same, an insulator means disposed within and adjacent the top of said can, said insulator means comprising a thin circular plastic disc having a central aperture and an axially upwardly extending flange, said insulator means positioned in said can with said carbon cathode projecting through said central aperture and with said flange in close parallel relationship to the top wall portion of the can, an end cap means secured to and closing the open end of said can, said cap means intimately contacting the top portion of said carbon cathode forming an electrical contact therebetween and provided with an aperture, an axially extending flange means on said end cap means disposed in close parallel relationship to said flange on said insulator means, the edges of the top edge portion of said can and said flange on said insulator means being secured together with the flange of said cap means in overlying relationship forming a sealed battery unit, a plug means of a resilient relatively soft material disposed in said aperture on said end cap means in sealed relation thereto, said battery adapted to remain inert over extended periods of time without deteriorating or self-discharging and adapted to be activated prior to being put into service by inserting the needle of a hypodermic syringe containing electrolyte through the plastic plug means and injecting electrolyte solution into the interior of said battery.

9. A sealed, deferred action type dry cell battery which will remain inert until activated comprising, a zinc can having a closed bottom end and an open top end, a porous liner means for said can, an elongated carbon cathode disposed axially within said can, a dry granular mixture of manganese dioxide and graphite disposed within said can in an amount sufficient to substantially fill same, an insulator means disposed within and adjacent the top of said can, said insulator means having an axially extending tubular portion positioned in close parallel relationship to the top of said can, an end cap means secured to and closing the open end of said can, said cap means contacting said carbon cathode, said cap means provided with an aperture therein and an axially extending flange disposed in close parallel relationship to said tubular portion of said insulator means, the edges of the top edge portion of said can and said tubular portion of said insulator means being secured together forming a sealed battery unit, a resilient plug means disposed in said aperture on said cap means, said battery adapted to remain inert over extended periods of time without deteriorating or self-discharging and adapted to be activated prior to being put into service by injecting electrolyte solution into the interior of said battery.

10. A sealed, deferred action type dry cell battery comprising, a unitary cylindrically shaped zinc can having a closed bottom end and an open top end, said can constituting the anode of said battery, a porous liner means for said zinc can, an elongated tubular carbon cathode disposed axially within said can, a dry mixture of manganese dioxide and graphite disposed within said can, an insulator means disposed within and adjacent the top end of said can, said insulator means comprised of a thin flat element having an aperture and an extending peripheral flange, said insulator means positioned in said can with said carbon cathode projecting through said aperture and with said flange arranged in parallel relationship to the top wall portion of the can, a cap means secured to and closing the open end of said can, said cap means having flange means disposed in close parallel relationship to said flange on said insulator means, the edges of the top edge portion of said can and said flange on said insulator means being secured together with the flange of said end cap means in overlying relationship forming a sealed battery unit, means associated with the cap means for activating said battery constructed and adapted in operation to enable electrolyte to be distributed to the sealed interior of the battery.

References Cited by the Examiner
UNITED STATES PATENTS

| | | | |
|---|---|---|---|
| 1,658,142 | 2/1928 | Stamm | 136—113.4 |
| 2,502,723 | 4/1950 | Harriss | 136—113 |
| 2,996,562 | 8/1961 | Meyers | 136—90 |

WINSTON A. DOUGLAS, *Primary Examiner.*

A. SKAPARS, *Assistant Examiner.*